(12) United States Patent
Ramakrishnan

(10) Patent No.: US 9,621,604 B2
(45) Date of Patent: Apr. 11, 2017

(54) STATISTICAL REMULTIPLEXING OF ABR STREAMS

(71) Applicant: Cisco Technology, Inc., San Jose, CA (US)

(72) Inventor: Sangeeta Ramakrishnan, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 267 days.

(21) Appl. No.: 14/023,548

(22) Filed: Sep. 11, 2013

(65) Prior Publication Data

US 2015/0071075 A1 Mar. 12, 2015

(51) Int. Cl.

| | |
|---|---|
| *H04L 12/811* | (2013.01) |
| *H04L 29/06* | (2006.01) |
| *H04N 21/24* | (2011.01) |
| *H04N 21/262* | (2011.01) |
| *H04N 21/654* | (2011.01) |
| *H04N 21/6547* | (2011.01) |
| *H04N 21/845* | (2011.01) |
| *H04L 29/08* | (2006.01) |

(52) U.S. Cl.
CPC .......... *H04L 65/4069* (2013.01); *H04L 47/38* (2013.01); *H04L 65/602* (2013.01); *H04L 65/80* (2013.01); *H04N 21/2401* (2013.01); *H04N 21/2402* (2013.01); *H04N 21/26258* (2013.01); *H04N 21/654* (2013.01); *H04N 21/6547* (2013.01); *H04N 21/8456* (2013.01); *H04L 67/02* (2013.01)

(58) Field of Classification Search
USPC .... 370/229, 230.1, 231, 232, 233, 234, 235, 370/236; 709/219, 231, 232, 217, 224, 709/233; 725/105, 116, 114, 115, 135, 725/138
See application file for complete search history.

(56) References Cited

U.S. PATENT DOCUMENTS

| | | | | |
|---|---|---|---|---|
| 2010/0299552 | A1* | 11/2010 | Schlack et al. | 714/4 |
| 2012/0254455 | A1* | 10/2012 | Adimatyam et al. | 709/231 |
| 2013/0091249 | A1* | 4/2013 | McHugh | H04N 21/23439 709/219 |
| 2014/0032781 | A1* | 1/2014 | Casey | H04N 21/2662 709/233 |
| 2014/0040498 | A1* | 2/2014 | Oyman et al. | 709/231 |
| 2014/0143440 | A1* | 5/2014 | Ramamurthy et al. | 709/231 |

* cited by examiner

*Primary Examiner* — Edan Orgad
*Assistant Examiner* — Saumit Shah
(74) *Attorney, Agent, or Firm* — Merchant & Gould P.C.

(57) ABSTRACT

Statistical remultiplexing of adaptive bit rate streams may be provided. First a video quality associated with a first representation of a content stream being delivered to a first client on a shared network may be determined. The content stream may be available in a plurality of representations, each representation comprising a plurality of chunks of varying sizes and a manifest having an indication of a quality level and a bit rate for the representation. Next, network conditions may be analyzed to determine whether a bit rate of the content stream being delivered to the first client device should be adjusted to adjust the video quality. Based on the determined video quality and the network conditions, it may then be communicated to the first client device to request a second representation of the content stream.

20 Claims, 4 Drawing Sheets

US 9,621,604 B2

STATISTICAL REMULTIPLEXING OF ABR STREAMS

TECHNICAL FIELD

The present disclosure relates generally to adaptive bit rate streaming.

BACKGROUND

Adaptive bit rate streaming is a technique that may be used in streaming multimedia over computer networks such as the internet. In the past, most video streaming technologies utilized streaming protocols such as RTP, however, current adaptive streaming technologies may use Hypertext Transfer Protocol (HTTP) and may be designed to work efficiently over large distributed HTTP networks such as the Internet.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
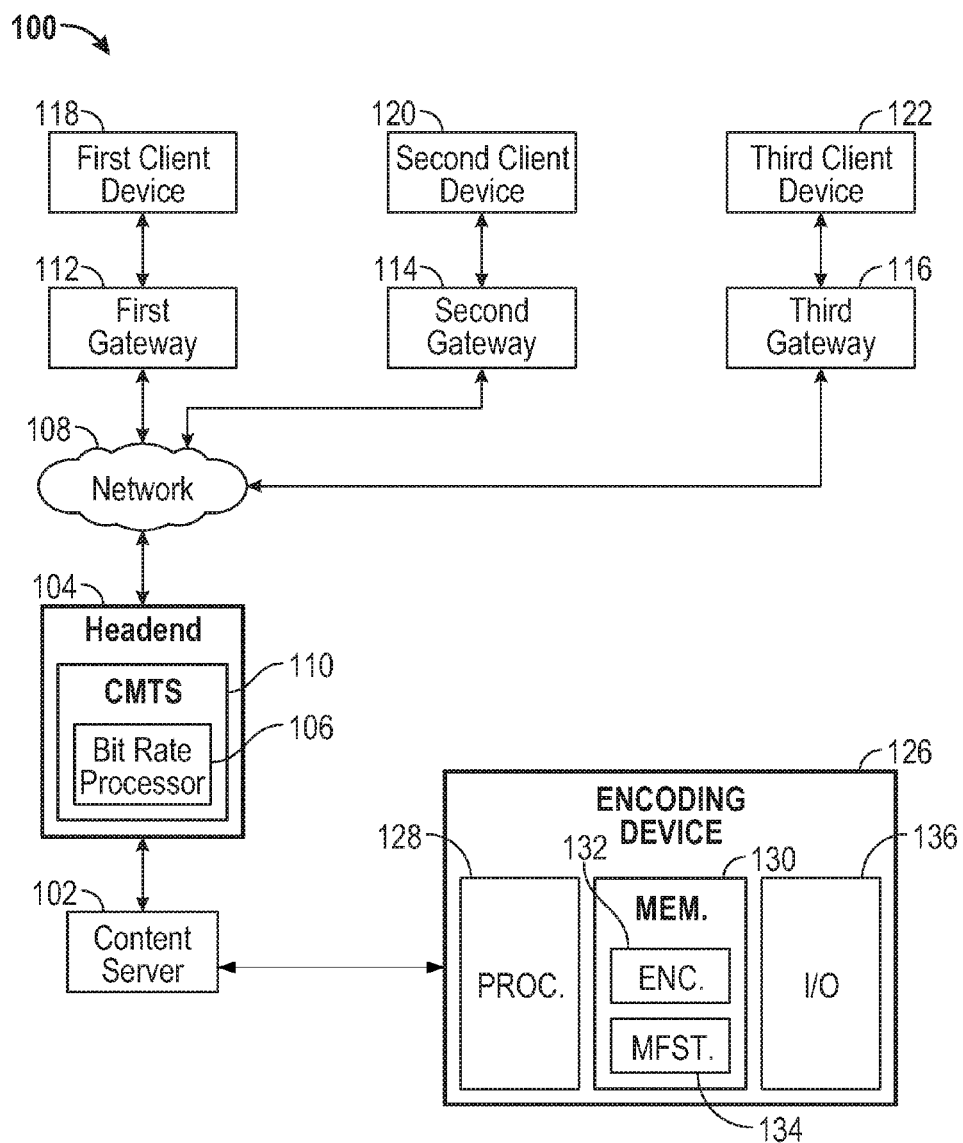
FIG. 1 shows an example adaptive bit rate system.

Statistical remultiplexing of adaptive bit rate streams may be provided. A video quality associated with a first representation of a content stream being delivered to a first client on a shared network may be determined. The content stream may be available in a plurality of representations, each representation comprising a plurality of chunks of varying sizes and a manifest having an indication of a quality level and a bit rate for the representation. Network conditions may be analyzed to determine whether a bit rate of the content stream being delivered to the first client device should be adjusted to adjust the video quality. Based on the determined video quality and the network conditions, it may be communicated to the first client device to request a second representation of the content stream.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Transmission of media content (e.g., video, audio, and/or data, etc.,) between different nodes on a network may be performed in a variety of ways. The type of content being transferred and the underlying network conditions may determine the methods used for communication. For instance, in the case of audio/video content delivery with real-time viewing requirements, one emphasis may be on low latency and efficient transmission to enable the best possible viewing experience, where occasional losses may be tolerated.

The structure of the data packets and the algorithms used for real-time content transmission on a given network may collectively define a chosen content streaming protocol. Although various content streaming protocols may differ in implementation, they may generally be classified into two main categories: push-based protocols and pull-based protocols. In push-based streaming protocols, once a connection is established between a server and a client, the server may remain active on the session and stream packets to the client until the session is torn down or interrupted, for example, by a client pausing or skipping in the content.

In pull-based streaming protocols, the client may be the active entity that requests the content from the server. Thus, the server response may depend on the client request, where otherwise the server may be idle or blocked for that client. Further, a bit rate at which the client wishes to receive the content may be determined by the client itself. The actual rate of reception may depend upon the client's capabilities, the load on the server, and the available network bandwidth. As the primary download protocol of the Internet, HTTP may be used as a common communication protocol upon which pull-based content delivery is based. An example of the pull-based streaming may include adaptive streaming.

In pull-based adaptive streaming, the client may make a decision about which specific representation of any given content it will request next from a server, where each representation may be received at the client in the form of a plurality of requested segments or chunks (e.g., 2-10 seconds in duration, such as a plurality of video frames of a given scene). Such a decision may be based on various parameters and/or observations, including the current (e.g., observed/available) bandwidth available for the client and the amount of data currently residing in a client buffer. Throughout the duration of a given viewing experience, the client may upshift or downshift (e.g., switch to a representation using a higher or lower bit rate) or stay at the same bit rate based on the available bandwidth and buffer conditions, among other factors. As a result of the bit rate transitions, encoded video quality as seen by the client's decoder may change considerably. Even in variable bit rate encoding schemes, despite an advertised (e.g., via a manifest) long-term average encoding bit rate, each of the chunks of a given representation may vary considerably in bit rate. In other words, while the long-term average quality and bit rate behave as conjugate variables, over the temporal chunking intervals (as used in adaptive streaming), quality and bit rate may diverge significantly.

Adaptive streaming (e.g., adaptive video streaming) generally structures a content stream as a multi-dimensional array of content chunks (e.g., piece of content, where a chunk may be one or more Groups of Pictures (GoP) as known in MPEG-compatible systems, or a "fragment" in MPEG-4 (MP4) systems, or other suitable sub-divisions of an entire instance of content, also can be called a fragment or a segment). A chunk may represent temporal slices of the content (e.g., 2-10 seconds in duration) that has been encoded or otherwise processed to produce differing levels of quality, different resolutions, etc., and in particular, has different sizes requiring different amounts of bandwidth to deliver to one or more client devices. Adaptive streaming systems may use a two-dimensional matrix, with one dimension consisting of the time, and the other dimension consisting of (target) encoding rate. In addition, adaptive streaming systems may use a variety of storage structures for the content, such as directories with individual files for each chunk, fragmented MP4 files (e.g., a standardized file format), or custom packaging schemes. The structure of the content matrix, along with associated metadata describing each chunk, may be contained in a separate structure, generally referred to as a manifest. The manifests may be divided into representations each of which describes one row of the content matrix (e.g., all the chunks encoded at a bit rate X).

In adaptive streaming, the client may be configured to achieve smooth, non-decreasing quality within given bandwidth constraints by choosing the next chunk based on the current quality level (e.g., corresponding to processing of the current chunk), shifting up when spare bandwidth enables reception of the chunk at a higher quality level faster (e.g., with a defined margin) than the time needed to receive a chunk of that temporal duration. Conversely, the client device may downshift to the best quality it can receive subject to bandwidth constraints when the bandwidth decreases. In steady-state operation of conventional systems, the client device may receive a constant bandwidth and may hence receive the same rate profile; however, it may result in fluctuations in video quality due to variations in video complexity.

Embodiments of the present disclosure may maximize yet equalize average quality or maximize minimum quality across a plurality of clients on a shared data link with a defined bandwidth. For example, a client device may be assigned a bandwidth over a shared link by a network management system, such as a headend. The client device may be configured to operate within this assigned bandwidth and may be configured to request content streams at bit rates such that it does not exceed the assigned bandwidth. For example, the client device may be assigned a bandwidth of 8 MBPS on a shared network, and may be configured to receive sports video and talking head video streams. The sports video stream may be available in three bit rates, 8 MBPS stream with good quality video, 6 MBPS with acceptable quality video, and 4 MBPS stream with poor quality video. The talking head video may also be available in three bit rates, 8 MBPS stream with excellent quality video, 6 MBPS stream with excellent video quality (the 8 MBPS stream may be barely any better than 6 MBPS stream in quality), 4 MBPS stream with good quality video, and 2 MBPS with acceptable quality video. The client device, since only 8 MBPS of total bandwidth is available to it, may be configured to split the total assigned bandwidth equally between the two streams, and opt for 4 MBPS stream for both the sports video and the taking head video. This may result in poor quality for the sports video and good quality for the talking head video. As the bandwidth is assigned by the headend device, and the client device is configured to operate within the assigned bandwidth, the video quality of the streams may suffer, even though bandwidth assigned to another client device on the shared link may be unused.

Consistent with embodiments of the disclosure, methods and systems described herein may provide a network management device, such as a cable model terminal system (CMTS), to assist the client device in selecting streams to optimize a video quality across multiple client devices sharing a common link. The systems and methods disclosed herein may maximize a minimum video quality for each client device, and equalize video quality across multiple client devices sharing the link. The video quality may be optimized based on a quality metric. The quality metric may include a minimum quality level for each content stream being accessed by each client device. As an example, the quality metric may include a column defining a minimum quality level for sports video stream, talking head video stream, news video stream, etc. The quality metric may further include a plurality of encoded content streams at plurality of quality levels and corresponding bit rates.

A bit rate processor (e.g., a statistical multiplexer), consistent with embodiments of the disclosure, may be located at a network management device, such as the headend, and may be configured to analyze a network condition of the shared link, and based on the quality metric, may assist the client device in improving the minimum video quality of the content stream available to the client device. As an example, the bit rate processor may advise the client device to upgrade a bit rate of one of the content streams. As another example, the bit rate processor may assign additional bandwidth to the client device or assign unused bandwidth from another client device, and advise the client device to request streams at higher bit rate, thereby increasing the video quality. The quality metric may further include a ranking of the content streams, which may enable the bit rate processor (or the client device) to select and upgrade a quality of a stream when additional bandwidth becomes available. As an example, a higher ranked stream may be preferred for upgrading over a lower ranked stream. The ranking may be provided by a subscriber associated with the client device.

Consistent with embodiments of the disclosure, the methods and systems described herein may provide a mechanism for a headend (e.g., a CMTS located at the headend) to manage bandwidth to be assigned to different client devices on a shared link. The mechanism may include dynamically adjusting, by the CMTS, bandwidth being provided to multiple client devices sharing a link to improve a minimum video quality for the client devices. As an example, if client device A is not using all of its assigned bandwidth, excess bandwidth from the client A may be assigned to client B to improve video quality of the streams being accessed by the client B. As another example, the CMTS may be configured to adjust bandwidth of the client devices on the shared network based on buffer levels of the client device.

FIG. 1 is a block diagram of an adaptive bit rate system 100 consistent with embodiments of the disclosure. System 100 may comprise a content server 102, a headend 104, a bit rate processor 106, and a network 108. Headend 104 may include a CMTS 110 in which bit rate processor 106 may be disposed. Bit rate processor 106 may be disposed in other locations in system 100 and is not limited to CMTS 110. For example, bit rate processor 106 may be disposed in a mobile network, a mobile packet core, a WiFi access point, a cable modem, or a residential gateway. Bit rate processor 106 may comprise, but is not limited to a statistical multiplexer (i.e. a statmux.)

Network 108 may comprise any type of network capable of transmitting and receiving content. System 100 may further include a plurality of gateways (e.g., a first gateway 112, a second gateway 114, and a third gateway 116.) The plurality of gateways may comprise, for example, but are not limited to cable modems, set top boxes, and computers. While system 100 shows the plurality of gateways comprising three gateways, embodiments of the disclosure are not so limited and may comprise any number of gateways.

The plurality of gateways may respectively correspond to a plurality of user devices (e.g., a first user device 118, a second user device 120, and a third user device 122.) The plurality of client devices may comprise, for example, but are not limited to computers, mobile devices, tablet devices, smart phones, and televisions. System 100 may further include an encoding device 126. While system 100 shows the plurality of user devices comprising three user devices, embodiments of the disclosure are not so limited and may comprise any number of user devices.

System 100 may be any type of system that may be configured to transmit data packets over a network (e.g., network 108). For example, system 100 may be a hybrid fiber-coaxial (HFC) system, and enabled to provide voice communications, and video and data services. System 100 may be based on a bi-directional transfer of packet based service, such as Internet Protocol (IP) traffic, between head-end 104 and the plurality of gateways.

The plurality of client devices, for example, may be hardware components including software applications that allow the plurality of client devices to communicate and receive packets corresponding to streaming media. The plurality of client devices may provide a display and one or more software applications, such as a media player, for displaying streaming media to respective one of the plurality of user devices. Further, the plurality of client devices may be capable of requesting and receiving data packets, such as data packets of streaming media, from the Internet. For example, first client device 118 may be configured to send request data to content server 102 for a particular file or object data of a web page by its URL. The plurality of client devices may be wired and/or wireless devices, such as cellular phones, personal digital assistants (PDAs), computer devices or systems such as laptops, personal computers, set-top terminals, televisions with communication capabilities, DVD/CD recorders, etc.,). First client device 118, including its components, is described in detail with respect to FIG. 3.

The plurality of gateways may be devices configured to convert formatted data provided in one type of network to a particular format required for another type of network. First gateway 112, for example, may be a cable modem device. In another example, first gateway 112 may be a server, a router, a firewall server, a host, or a proxy server. First gateway 112, for example, may have an ability to transform signals received from first client device 118, into a signal that network 108 can understand and vice versa. First gateway 112 may be capable of processing audio, video, and T.120 transmissions alone or in any combination, and may be capable of full duplex media translations.

Network 108 may include any combination of wide area networks (WANs), local area networks (LANs), or wireless networks suitable for packet-type communications, such as Internet communications. As an example, network 108 may be a packet switched network or a hybrid-coaxial (HFC) cable network.

Content server 102 may be configured to receive the request data from the plurality of client devices, process the request data accordingly, and return the response data back to the plurality of client devices, through headend 104. For example, content server 102 may be a web server, an enterprise server, or any other type of server. Content server 102 may be a computer or a computer program responsible for accepting requests (e.g., HTTP, RTSP, or other protocols that can initiate a media session) from the plurality of client devices and serving the plurality of client devices with streaming media. Content server 102 is described in greater detail below with respect to FIG. 2.

A function of bit rate processor 106 may be to maximize average quality or maximize minimum quality across the plurality of clients (e.g., first client 118, second client 120, and third client 122) on a shared data link with a defined bandwidth while ensuring, for example, that the plurality of clients do not under run their buffer. Bit rate processor 106 may allocate bandwidth to each of the plurality of client such that quality is equalized across the plurality of clients.

If two clients (e.g., first client 118 and second client 120) have comparable buffer levels, the bandwidth may be divided by bit rate processor 106 amongst the two clients such that the quality level is kept the same across the two clients. Hence a fast action scene that may require more bits for a given quality may be allocated more bandwidth than say a "talking head" scene. Allocation of more bandwidth to such a fast action scene client may likely cause its buffer to fill faster and hence cause it to upshift in a subsequent fragment.

Similarly if two clients (e.g., first client 118 and second client 120) have comparable quality profiles, but have different buffer levels, bit rate processor 106 may allocate more bandwidth to the client with lower buffer level, to reduce its likelihood of underflowing the buffer (that may cause a picture freeze) and/or having to request in the future a profile with a lower associated bit rate (and hence lower quality) due to low buffer levels.

Bit rate processor 106 may also direct one of the plurality of clients to upshift to a specified profile for which bit rate processor 106 is able to allocate bandwidth for and thereby improves the quality of video seen by that client. For example, bit rate processor 106 may direct a client device to request a higher video quality stream. Bit rate processor 106 may also direct one of the plurality of clients to downshift to a specified profile when bit rate processor 106 observes that the loss in quality is insignificant compared to the bandwidth saved by downshifting. The downshift may be done when network 108 is congested and bit rate processor 106 may allocate the saved bandwidth to another one of the plurality of clients. For example, bit rate processor 106 may direct a client to request a lower video quality stream, thereby saving a portion of the bandwidth that may be allocated to another client that may benefit with a more significant improvement in quality. In other words, bit rate processor 106 may use the bits where its gets the most quality improvement for the bits spent.

Bit rate processor 106 may also work on top of a bandwidth reservation mechanism where a system operator may wish to reserve some minimum amount of bandwidth per stream. Any bandwidth available beyond the reserved minimum could be allocated using the process described above.

Consistent with embodiments of the disclosure, bit rate processor 106 may take into account policies to achieve desired quality for different clients, which may not necessarily be equal quality. For example it may be desirable to provide higher quality to big screen TVs (e.g., second client device 120) than to PCs (e.g., third client device 122.) Or paid content (e.g., a premium channel) may be treated differently than free content. In other words, business policies may be used on top and in conjunction with the processes described above.

Encoding device 126 may be configured with a processor 128, a memory 130. Memory 130 may comprise an encoding logic (executable instructions or code) 132 and a communications interface 136. Communications interface 136 may receive content streams for encoding and segmenting (also chunking or fragmenting) and send encoded streams in the form of chunks of different quality levels to content server 102. In one embodiment, communications interface 136 may receive a digitized content stream (e.g., a movie, a live broadcast of a television show or sports or entertainment event, etc.). Processor 128 may be configured by the encoding logic 132 to encode the content stream at a plurality of encoded representations of different quality levels. For instance, one representation may comprise an encoded version of the received content stream at a quality level (measured in PSNR—Peak Signal-to-Noise Ratio) of 40 decibels (dB), a second representation may comprise an encoded version of the received content stream at a quality level of 35 dB, and a third representation may comprise an encoded version of the received content stream at a quality level of 30 dB.

Processor 128 may be further configured by the encoding logic 132 to segment each of the plural representations into chunks of different quality levels. Metadata for all chunks of a given quality level may be listed in a manifest (MFST) 134 under a respective representation. In other words, each representation may correspond to a different quality level. Each quality level may explicitly be indicated (e.g., as opposed to being inferred from bit rate), with the explicit indication corresponding to a quality metric such as mean square error (MSE), peak signal-to-noise ratio (PSNR), or other well-known quality metrics. Encoding device 126 may provide a manifest 134 (or in some embodiments, information used to assemble one elsewhere) and the chunks for the various representations via the communications interface 136 to the origin content server 102. Although described in the context of encoding software or firmware logic 132 stored in memory 130, the encoding/chunking functionality may be separated among a plurality of modules, or in some embodiments, implemented using hardware or a combination of hardware and software/firmware.

Figure 2:
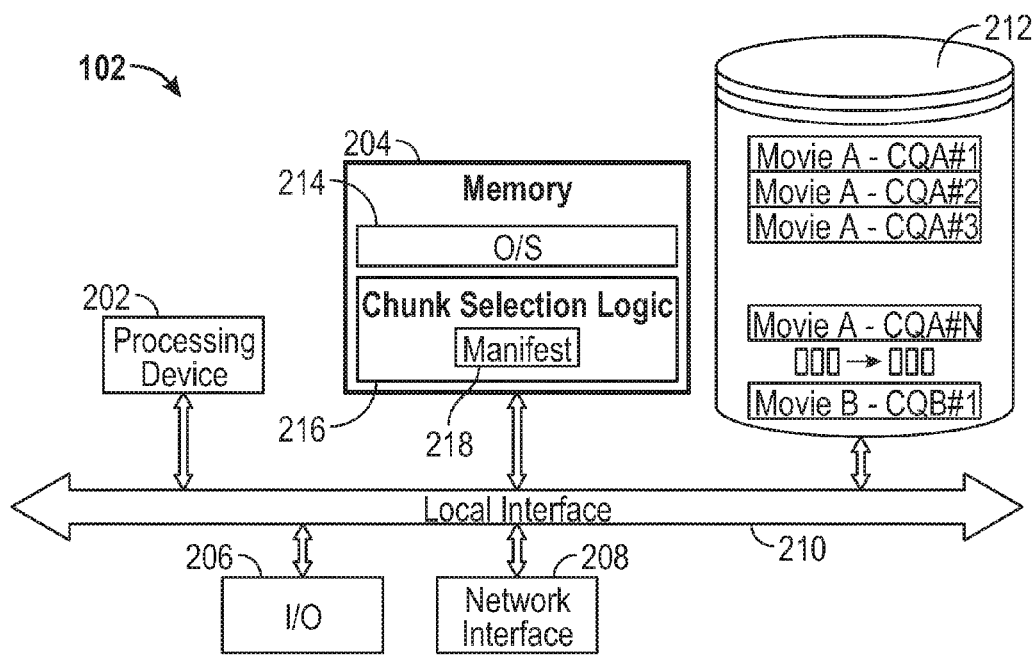
FIG. 2 shows an example content server.

FIG. 2 shows content server 102 in greater detail. As shown in FIG. 2, content server 102 may include a processing device 202, a memory 204, input/output (I/O) devices 206, and a network interface 208, each of which may communicatively be coupled via a local interface 210. Processing device 202 may be a hardware device for executing software, particularly that which may be stored in memory 204. Processing device 202 may be any custom made or commercially available processor, a central processing unit (CPU), an auxiliary processor among several processors associated with content server 102, a semiconductor-based microprocessor (in the form of a microchip or chip set), a microprocessor, or generally any device for executing software instructions.

Network interface 208 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 206 may include input devices, for example but not limited to, a keyboard, mouse, scanner, microphone, etc. Furthermore, the I/O devices 206 may also include output devices, for example but not limited to, a printer, display, etc.

Local interface 210 may be, for example but not limited to, one or more buses or other wired or wireless connections. Local interface 210 may have additional elements, which are omitted for simplicity, such as controllers, buffers (caches), drivers, repeaters, and receivers, to enable communications. Further, local interface 210 may include address, control, and/or data connections to enable appropriate communications among the aforementioned components.

In one embodiment, content server 102 may further be configured with an integrated storage device 212 coupled to local interface 210. Storage device 212 may be configured to store a plurality of content chunks received from encoding device 126. In some embodiments, storage device 212 may be externally coupled to content server 102.

Memory 204 may include a suitable operating system (O/S) 214 and chunk selection logic 216. Operating system 214 essentially may control the execution of other computer programs, such as chunk selection logic 216, and may provide scheduling, input-output control, file and data management, memory management, and communication control and related services. Chunk selection logic 216 may include executable code to respond to client device requests for chunks (e.g., HTTP functionality), as well as a data structure corresponding to a fully or partially (yet continually updated) completed manifest 218 that corresponds to manifest 134 (or information therein) sent by encoding device 126. In some implementations, manifest 218 may not be complete, yet continually assembled and updated from encoding device 126 (e.g., such as for live broadcasts).

Storage device 212 may store different representations of content in the form of chunks of different quality levels. For instance, using a movie as an example, storage device 212 may store a first representation of Movie A at a first quality level (e.g., Movie A—Profile 1), a second representation of Movie A at a second quality level (e.g., Movie A—Profile 2), and so on. Each representation may be in the form of plural chunks at the given quality level, as partially illustrated by the individual, shorter blocks for representation Profile N in FIG. 2 (and similarly applicable to the other representations). Each of the chunks may typically be independently decodable (e.g., each in the form of closed Groups of Pictures (GOP)), and generally may last in duration of 2-10 seconds, though not limited to these durations. For each of these different quality level chunks, a corresponding representation with associated metadata for each of the chunks may be maintained in the manifest 218 stored in memory 204.

Chunk selection logic 216 may be configured to respond to requests from any one or more of the plurality of client devices for manifest 218, or select portions thereof. These fetch requests may be serviced through either the same, or a different server connection as the one used to fetch content chunks. Using first client device 118 embodied as a set-top box as an example client device hereinafter (with the understanding that similar principles apply to the other client devices), in one embodiment, first client device 118 may request a chunk based on the listing of manifest 218 fetched from content server 102.

Memory 204 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 204 may incorporate electronic, magnetic, optical, semi-conductive, and/or other types of storage media. Note that memory 204 may have a distributed architecture, where various components are situated remotely from one another, which can be accessed by the processing device 202.

The software in memory 204 may include one or more separate programs, each of which comprises an ordered listing of executable instructions for implementing logical functions. In the embodiment shown in FIG. 2, the software in memory 210 may include operating system 214 and chunk selection logic 216, as explained above. Functionality of chunk selection logic 216 may be implemented using a single module, or distributed among a plurality of modules.

When chunk selection logic 216 is in operation, processing device 202 may be configured to execute chunk selection logic 216 stored within memory 204, to communicate data to and from memory 204, and to generally control operations of chunk selection logic 216. Chunk selection logic 216 and O/S 214, in whole or in part, but typically the latter, are read by processing device 202, perhaps buffered within processing device 202, and then executed.

Figure 3:
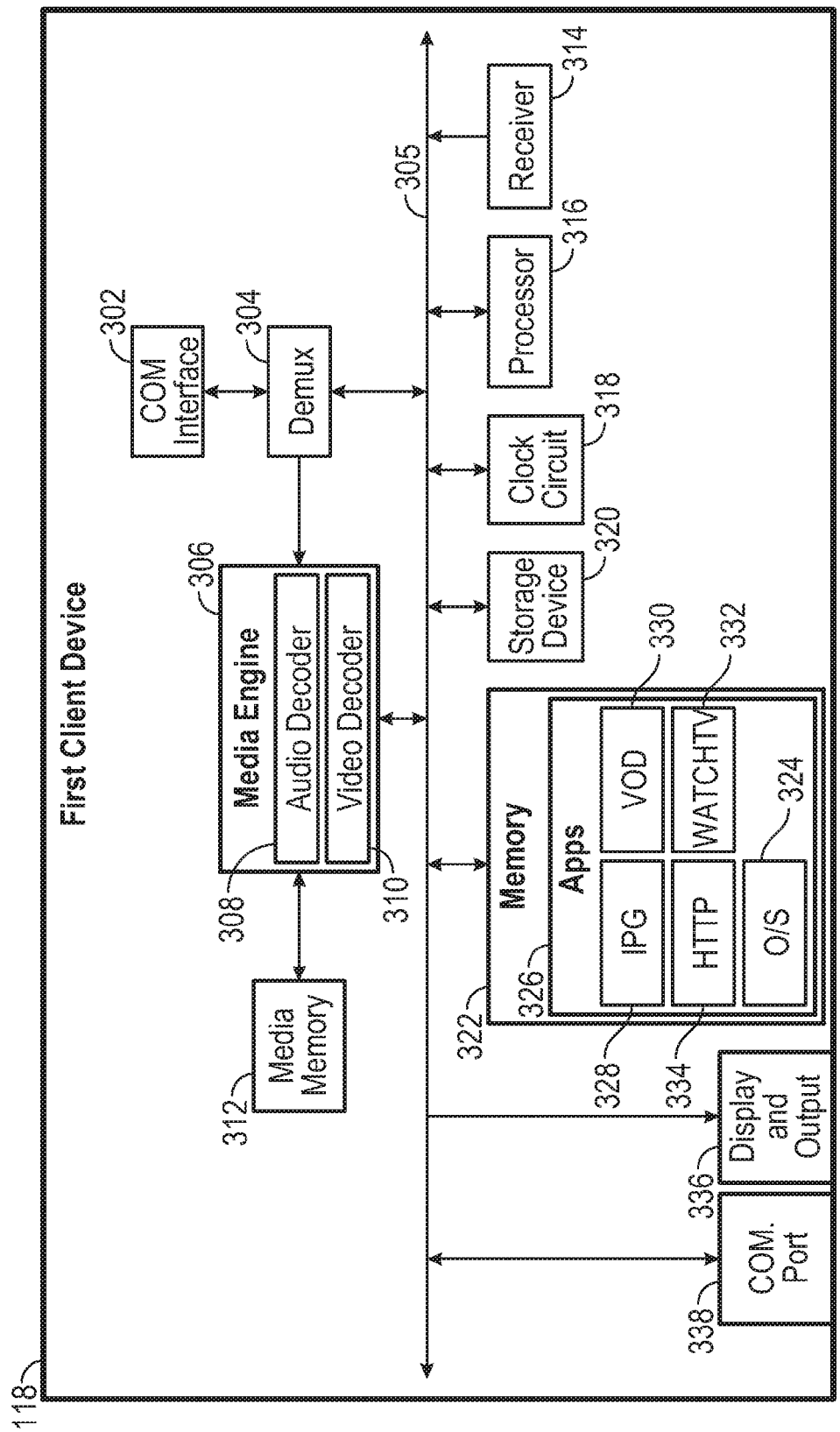
FIG. 3 shows an example client device.

FIG. 3 shows one example embodiment of first client device 118 in greater detail. Second client device 120 and third client device 122 may be of similar construction. As shown in FIG. 3, first client device 118 may include a communication interface 302 suitable for enabling communication (e.g., TCP/IP) with other devices of system 100, and for receiving a manifest (or information therein) as well as the requested chunks. For instance, communication interface 302 may be of a type suitable for communication over an IP network, a coaxial cable network, an HFC network, and/or wireless network, among others.

Communication interface 302 may be coupled to a demultiplexer (e.g., a demux 304.) Demux 304 may be configured to parse the metadata (e.g., in the packet header or in manifest 218) of the chunks and the body or payload data (the content, such as the sequence of video and/or audio frames). The metadata may include timestamp information, packet identifiers, program numbers, quality level, and/or other information necessary to decode the received chunk. The chunk and metadata information may be forwarded to or otherwise received by a media engine 306 as explained further below.

Although first client device 118 is described in the context of various internet video streaming implementations, such as IPTV and VoD, first client device 118 may comprise additional and/or different components in some embodiments. For instance, first client device 118 may include a tuner system (e.g., radio frequency tuning, not shown) coupled to communication interface 302. The tuner system may comprise one or more tuners for receiving transport streams received via communication interface 302. Further a demodulator may be employed to demodulate the received carrier signal when demux 304 is configured to parse the transport stream packets of one or more defined carrier frequencies.

Demux 304 may be coupled to a bus 305 and to media engine 306 (i.e. an audio/video (A/V) processing or decoding device). Media engine 306 may include decoding logic comprising one or more of a respective audio decoder 308 and video decoder 310 that decodes (e.g., decompress and reconstruct) the chunks received via communications interface 302. When the chunks are played back, the original content stream may be reconstructed in a seamless fashion.

Media engine 306 may further include buffer management functionality to facilitate (e.g., in cooperation with an HTTP logic 334) a determination as to current buffer level at first client device 118. Media engine 306 may further be coupled to bus 305 and to a media memory 312 that may comprise one or more buffers for temporarily storing compressed and/or reconstructed pictures and/or audio frames. In some embodiments, the buffers of media memory 312 and/or other buffers (e.g., network buffers) may reside in other memory (e.g., a memory 322, explained below), or distributed among media memory 312 and memory 322.

First client device 118 may include additional components coupled to bus 305. For instance, first client device 118 may further include a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.). First client device 118 may further include a processor 316 for controlling operations of first client device 118 and a clock circuit 318 comprising phase and/or frequency locked-loop circuitry (or software, or combination of hardware and software) to lock into system clock information received in an audio, video, or NV stream to facilitate decoding operations and to clock the output of reconstructed audiovisual content.

First client device 118 may further comprise a storage device 320 (and associated control logic) to temporarily store buffered content and/or to more permanently store recorded content. Memory 322 in first client device 118 may include volatile and/or non-volatile memory, and may be configured to store executable instructions or code associated with an operating system (O/S) 324, and one or more applications 326 (e.g., an interactive programming guide (IPG) 328, a video-on-demand (VoD) app 330, aWatchTV app 332 (associated with broadcast network TV), HTTP logic 334, among other applications such as pay-per-view, music, personal video recording (PVR), driver software, etc.).

Profile selection logic may comprise HTTP client functionality, and may generate requests for chunks received from content server device 102. In some embodiments, to generate requests for chunks by communicating bandwidth constraints and other information that may exclude the explicit quality level. Decisions by HTTP logic 334 to switch up or down (or maintain) the current quality level may be based on feedback from CMTS 110 based on network conditions (e.g., buffer levels, and monitored bandwidth constraints).

First client device 118 may further be configured with display and output logic 336, as indicated above that may include graphics and video processing pipelines, among other circuitry to process the decoded pictures and associated audio and provide for presentation (e.g., display) on, or associated with, a display device or other media device. A communications port 338 (or ports) may further be included in first client device 118 for receiving information from and transmitting information to other devices. For instance, communication port 338 may feature USB (Universal Serial Bus), Ethernet, IEEE-1394, serial, and/or parallel ports, etc. In addition, communications port 338 may be configured for home networks (e.g., HPNA/MoCA, etc.). First client device 118 may also include an analog video input port for receiving analog video signals.

Figure 4:
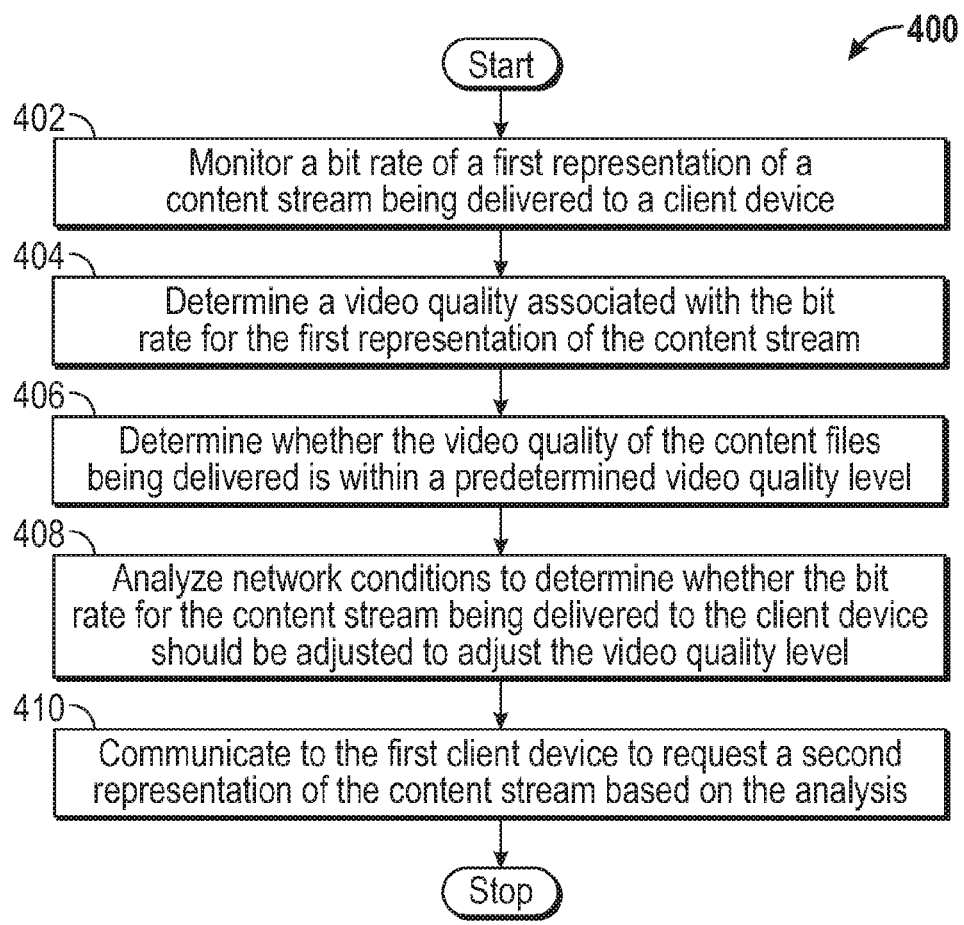
FIG. 4 is an example flow chart of a method for managing video quality.

Having described various components of certain embodiments of system 100, a method 400 implemented by bit rate processor 106 will now be described with reference to FIG. 4. At block 402, bit rate processor 106 may be configured to monitor a bit rate of each content streams being delivered to a client device. As an example, bit rate processor 106 may monitor a bit rate of representations of the content streams being delivered to first client device 118. The bit rate of the content streams may be monitored by monitoring manifest files for the representation of the content streams.

In addition, bit rate processor 106 may receive a minimum video quality for the content streams being requested by first client device 118. As an example, a user of first client device 118 may provide, through input devices, a minimum video quality for the content streams being requested. In addition to the user, a service provider may provide a minimum video quality for the content streams provided to the users. The video quality may be mapped to a corresponding bit rate. As an example, a bit rate for a live sports stream may be predetermined at 4 MBPS. In addition to the minimum video quality for the content streams, the user may also provide a ranking of the content streams. As an example, the user may provide a ranking of the video streams for upgrade in video quality.

In one embodiment, bit rate processor 106 may be configured to obtain a quality metric. The quality metric, for example, may include a plurality of content streams for first client device 118 and a minimum video quality associated with each of the plurality of content streams. The quality metric may further include a plurality of representations available for each of the plurality of content streams. Each of the plurality of representations may be mapped to a bit rate and a video quality corresponding to each bit rate. The bit rate and the video quality for each of the representations for a content stream may be obtained from manifest files of the representations.

At block 404, bit rate processor 106 may determine whether video quality of the representations being delivered to first client device 118 is within a predetermined video quality level. The video quality of the representation may be determined from the manifest files or the quality metric. The determined video quality may be compared with the minimum video quality defined for the content stream. As an example, bit rate processor 106 may determine a video quality of the representation being delivered to first client device 118 from the manifest files of the representation. Bit rate processor 106 may further determine a minimum video quality defined for the content stream. Bit rate processor 106 may compare the determined video quality with the minimum video quality. Bit rate processor 106 may further determine if the video quality of the representation being delivered is within predetermined level.

At block 406, bit rate processor 106 may analyze network conditions to determine whether the bit rate for the content stream being delivered to first client device 118 may be adjusted to adjust the video quality level. As an example, bit rate processor 106 may analyze the video quality of each stream being accessed by first client device 118, and a corresponding bit rates. As another example, bit rate processor 106 may analyze bandwidth assigned to each of the plurality of client devices on the shared network, and a level of usage of the assigned bandwidth by each of the plurality of client devices. In yet another example, bit rate processor 106 may analyze a video quality for each of the plurality of client devices over the shared network. In yet another example, bit rate processor 106 may analyze a buffer size of each of the plurality of client devices on the shared network.

At block 408, adjusting the bit rate of at least one the content streams being delivered to first client device 118 based on the analysis. As an example, bit rate processor 106 may determine a video quality of the content streams being delivered to first client device 118, a corresponding video quality for each of the content streams, and a bit rate associated with each of the content streams. Bit rate processor 106 may determine a total available bandwidth for first client device 118, and bit rate of available representations of the content streams being delivered to the client device. Bit rate processor 106 may determine whether a bit rate of at least one of the content streams being delivered to the client may be adjusted to increase an overall video quality. As an example, bit rate processor 106 may determine that by lowering a bit rate of a first stream may not affect the video quality of the first stream to a great extent, but providing the addition bandwidth from the first stream to a second stream may increase a video quality associated with the second stream significantly, thereby increasing an overall video quality of the content streams available at the client device.

In another example, bit rate processor 106 may determine bandwidth associated with multiple client devices over a shared network. Bit rate processor 106 may further determine a usage level of the bandwidth and video quality level of the streams. Bit rate processor 106 may also determine a buffer level for each of the plurality of client devices. Bit rate processor 106 may allocate a part of assigned bandwidth from first client device 118 to second client device 120 based on the bandwidth usage, the buffer level, and the video quality. As an example, bit rate processor 106 may assign unused bandwidth from first client device 118 to second client device 120. Second client device 120 may request for representations having higher bit rates, thereby increasing the video quality. As another example, bit rate processor 106 may assign additional bandwidth to a one of the plurality of client devices having lower buffer level.

Various parts of the present disclosure refer to multicast and unicast transmissions of video content. Embodiments of the disclosure may be employed for optimizing bit rates of various content types of various transmission protocols and are not limited to multicast and/or unicast protocols. As an example, bit rate processor 106 may be configured to assist the plurality of client devices in requesting content representations of a content stream to achieve a better video quality. Moreover, bit rate processor 106 may enable a better use of the shared bandwidth. In addition, control of video quality at bit rate processor 106 may decrease processing requirements at the plurality of client devices.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining a video quality associated with a first representation of a content stream being delivered to a first client device on a shared network, wherein the content stream is available in a plurality of representations, each representation comprising a plurality of chunks of varying sizes and a manifest having an indication of a quality level and a bit rate for the representation, wherein the shared network is shared by the first device and a second device;
    determining network conditions for each of the first client device and the second client device, wherein determining the network conditions comprises:
        determining a first assigned bandwidth and a first list of content streams being delivered to the first client device, and
        determining a second assigned bandwidth and a second list of the content streams being delivered to the second client device;
    determining based on the determined network conditions and a quality metric for the shared network, whether a bit rate of the content stream being delivered to the first client device should be adjusted to adjust the video quality, wherein the quality metric comprises a minimum quality level for each of the content streams being delivered to the first device and the second device, wherein the quality metric further comprises a plurality of representations at plurality of quality levels for each of the content streams and corresponding bit rates for the plurality of representations, wherein determining to adjust the bit rate of the content stream comprises:
        determining, based on the quality matric and the first list of the content streams, a first average quality level for the first client device,
        determining, based on the quality metric and the second list of the content streams, a second average quality level for the second client device, and
        determining, based on the quality matric, the first assigned bandwidth, and the second assigned bandwidth, a second representation of the bit stream to maximize the first average quality level and the second average quality level of the content streams being delivered to the first client device and the second client device; and
    communicating to the first client device to request the second representation of the content stream.

2. The method of claim 1, wherein determining the network conditions comprises determining at least one of: an aggregate bandwidth available to a plurality of client devices connected on the shared network, and any pre-existing network policies associated with the aggregate bandwidth.

3. The method of claim 2, further comprising reallocating a portion of the second assigned bandwidth from the second client device to the first client device.

4. The method of claim 1, wherein determining the network conditions further comprises monitoring buffer levels at each of the first client device and the second client device.

5. The method of claim 4, further comprising reallocating a portion of the second assigned bandwidth from second client device to the first client device, when the first client device has a lower buffer level.

6. The method of claim 1, wherein communicating to the first client device to request the second representation of the content stream comprises sending, by the first client device, a request for the second representation to a content server.

7. The method of claim 6, wherein sending, by the first client device, the request for the second representation to the content server comprises sending the request for the second representation to the content server, the second representation comprising a higher video quality than the first representation.

8. A system comprising:
    a plurality of client devices configured to receive content streams from a video server over a shared network, each of the content streams having a manifest for plural encoded representations of the content streams, each representation fragmented into plural chunks of varying size, each representation comprising a different video quality level, the manifest listing the plurality of representations, wherein the shared network is shared by each of the plurality of client devices; and
    a bit rate processor configured to:
        monitor a video quality associated with each of the representations of the content streams being delivered to the plurality of client devices,
        determine whether the video quality of the representations of the content streams being delivered to the plurality of client devices are within a predetermined video quality level,
        determine network conditions for a first client device and a second client device of the plurality of client devices, the network conditions comprising:

a first assigned bandwidth and a first list of content streams being delivered to the first client device, and a second assigned bandwidth and a second list of the content streams being delivered to the second client device, determine, based on the determined network conditions and a quality metric for the shared network, whether the representation of a content stream being delivered to the first client device should be adjusted to adjust the video quality level, wherein the quality metric comprises a minimum quality level for each of the content streams being delivered to each of the first device and the second device, wherein the quality metric further comprises a plurality of representations at plurality of quality levels for each of the content streams and corresponding bit rates for the plurality of representations, wherein the bit rate processor being configured to determine to adjust the bit rate of the content stream comprises the bit rate processor being configured to:

determine, based on the quality matric and the first list of the content streams, a first average quality level for the first client device, determine, based on the quality metric and the second list of the content streams, a second average quality level for the second client device, and determine, based on the quality matric, the first assigned bandwidth, and the second assigned bandwidth, a second representation of the bit stream to maximize the first average quality level and the second average quality level of the content streams being delivered to the first client device and the second client device, and communicate to the first client device to request a second representation of the content stream.

9. The system of claim 8, wherein a bit rate associated with a representation of a content stream comprises the video quality.

10. The system of claim 9, wherein the bit rate processor is further configured to select a different representation of the content stream based on an overall available bandwidth and the bit rate for the different representation.

11. The system of claim 8, wherein the predetermined video quality level is determined based on type of program being delivered to the plurality of client devices.

12. The system of claim 8, wherein metadata for each chunk comprises one of the plurality of quality levels and a size of the chunk with its duration information or the chunk bit rate.

13. The system of claim 8, wherein the content streams comprises one of the following: audio, video, and a combination of audio and video.

14. An apparatus comprising:
a memory comprising logic; and
a processor configured by the logic to:
determine a video quality associated with a first representation of a content stream being delivered to a first client device on a shared network, wherein the content stream is available in a plurality of representations, each representation comprising a plurality of chunks of varying sizes and a manifest having an indication of a quality level and a bit rate for the representation, wherein the shared network is shared by the first client device and a second client device;

determine network conditions for each of the first client device and the second client device, the network conditions comprising:
a first assigned bandwidth and a first list of content streams being delivered to the first client device, and
a second assigned bandwidth and a second list of the content streams being delivered to the second client device, determine, based on the determined network conditions and a quality metric for the shared network, whether a bit rate of the content stream being delivered to the first client device should be adjusted to adjust the video quality, wherein the quality metric comprises a minimum quality level for each of the content streams being delivered to each of the first device and the second device, wherein the quality metric further comprises a plurality of representations at plurality of quality levels for each of the content streams and corresponding bit rates for the plurality of representations, wherein the processor being configured determine whether to adjust the bit rate of the content stream comprises the processor being configured to:

determine, based on the quality matric and the first list of the content streams, a first average quality level for the first client device, determine, based on the quality metric and the second list of the content streams, a second average quality level for the second client device, and determine, based on the quality metric, the first assigned bandwidth, and the second assigned bandwidth, a second representation of the bit stream to maximize the first average quality level and the second average quality level of the content streams being delivered to the first client device and the second client device; and communicate to the first client device to request a second representations of the content stream.

15. The apparatus of claim 14, wherein the processor is located in one of the following: a cable modem terminal system (CMTS), a mobile network, a mobile packet core, a WiFi access point, a cable modem, a digital subscriber line (DSL) modem, and a residential gateway.

16. The apparatus of claim 14, wherein the quality metric comprises a plurality of content streams available for the first client device, a plurality of representations for each of the plurality of content streams, a bit rate associated with each of the plurality of representations, and a video quality associated with each of the plurality of representations.

17. The apparatus of claim 16, wherein the quality metric is obtained by parsing manifest files of the plurality of representations.

18. The apparatus of claim 16, wherein the processor is further configured to reallocate a portion of the second assigned bandwidth to the first client device.

19. The apparatus of claim 14, wherein the processor is further configured to compare the determined video quality with a predetermined video quality defined by a user of the first client device.

20. The apparatus of claim 19, wherein the predetermined video quality level is determined based on an input from a user of the first client device.

* * * * *